Patented June 5, 1951

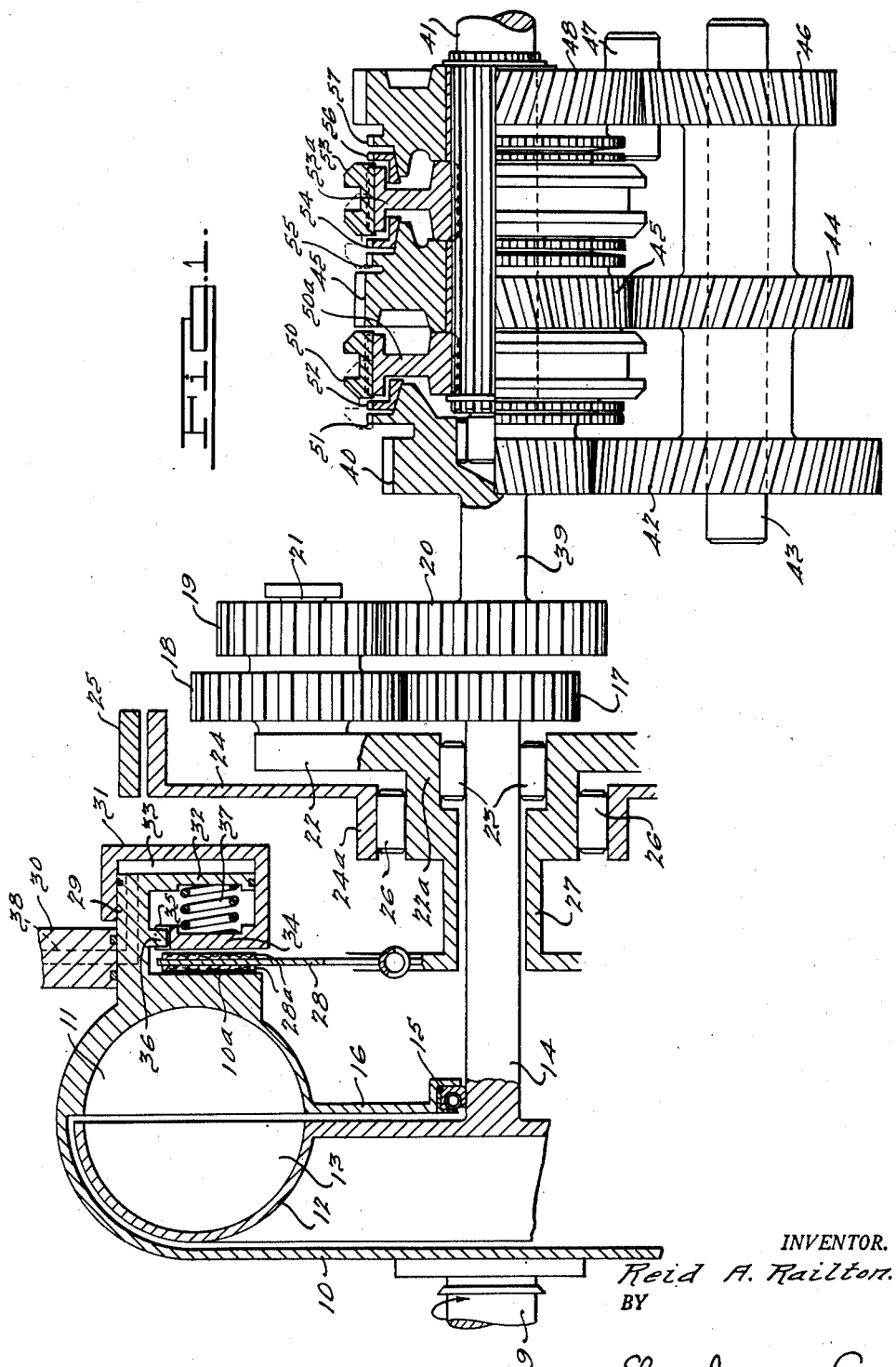

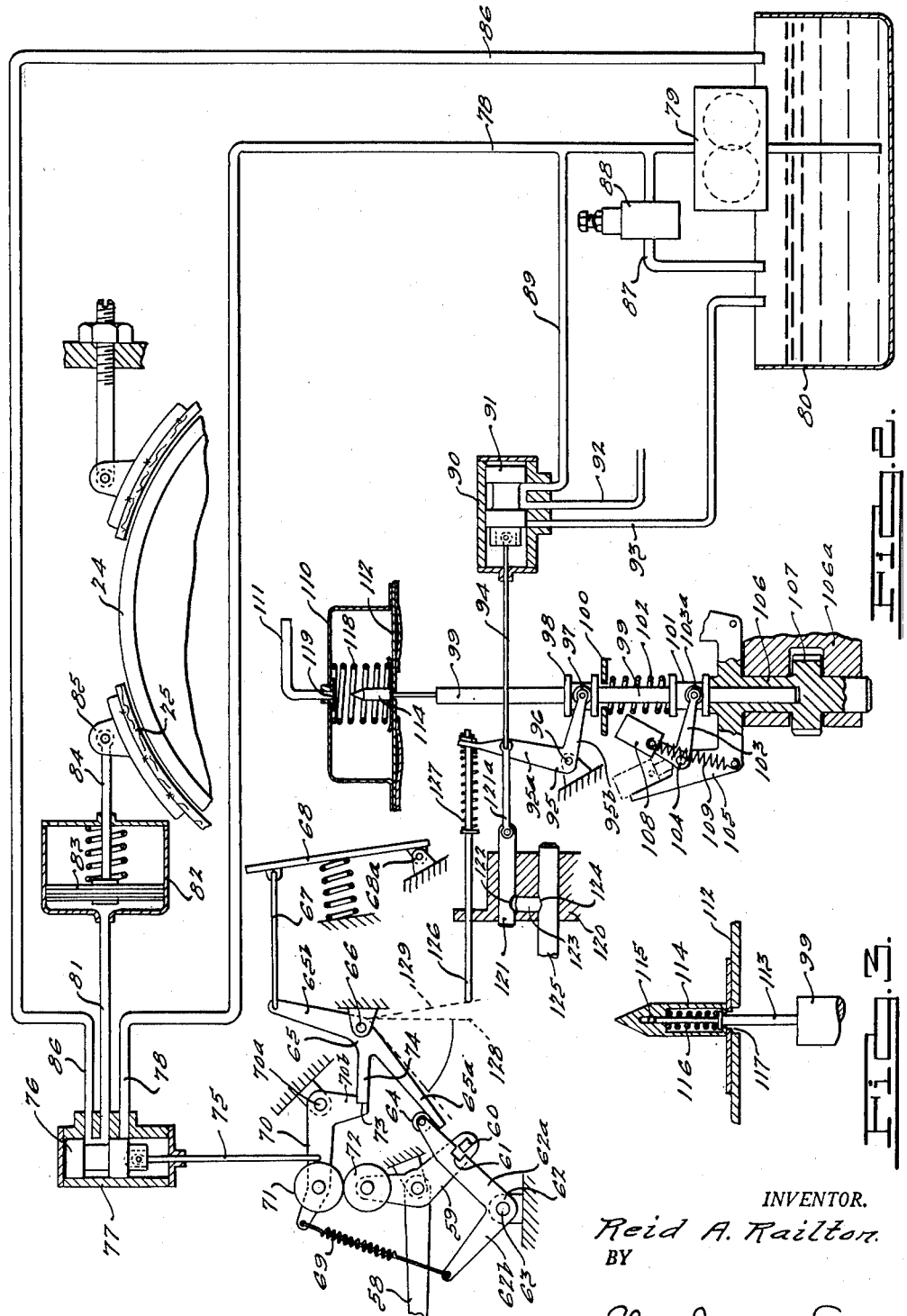

2,555,702

UNITED STATES PATENT OFFICE 2,555,702

VARIABLE SPEED TRANSMISSION

Reid A. Railton, Berkeley, Calif., assignor to Hudson Motor Car Company, Detroit, Mich., a corporation of Michigan Application January 6, 1948, Serial No. 749

20 Claims. (Cl. 74—732)

This invention relates to variable speed transmissions and in particular to transmissions of the class utilizing a so-called fluid flywheel or coupling and a planetary gear mechanism, and wherein the desired variation in speed ratios under variable load conditions may be automatically obtained without the use of a clutch pedal.

In variable speed transmissions of the foregoing class the fluid flywheel, which is composed of driving and driven members, is mounted on the input shaft. The driven member of the fluid flywheel is connected to one member, usually the sun gear, of the planetary gear-set, while the driving member is connected through a friction clutch with another member, usually the planet cluster, of the same planetary gear-set. In the operation of a variable speed transmission of the above mentioned type two gear ratios are obtainable. When the friction clutch is disengaged the entire drive passes through the fluid flywheel or coupling and an over-all gear reduction is obtained through the planetary gear-set. When, however, the friction clutch is engaged the drive passes through both the fluid flywheel and the friction clutch, and the drive is direct, such as at a one to one ratio except for the slippage which occurs in the fluid flywheel. Heretofore, this slippage in high gear in the fluid flywheel or coupling has been a drawback because of the resulting loss in efficiency. A primary object of the present invention, therefore, is to eliminate this slippage in high gear or direct drive, while retaining the desirable advantages thereof at reduced speed ratios where it is desirable for starting and maneuvering.

A further and more specific object of the invention is to provide an improved variable speed transmission of the above mentioned class in which an over-running clutch is interposed between the driven member of the fluid flywheel and the driven member of the friction clutch whereby, during operation, slippage in the flywheel is eliminated when the transmission is in direct drive but is permitted when the drive is at reduced speed ratios.

Another object of the invention is to provide improved control mechanism for a variable speed transmission of the above mentioned class wherein the only manual controls are an accelerator pedal and a conventional gear shift lever, and wherein the transmission is fully automatic under all driving conditions where the use of a conventional low or reverse gear would not normally be required.

Other objects of this invention will appear in the following description and appended claims, reference being had to the accompanying drawings forming a part of this specification wherein like reference characters designate corresponding parts in the several views.

Fig. 1 is a fragmentary central longitudinal sectional view, partly diagrammatical, of a variable speed transmission embodying the present invention.

Fig. 2 is a diagrammatic view of the control mechanism.

Fig. 3 is an enlarged fragmentary sectional view of the needle valve forming part of the vacuum control mechanism for the centrifugal governor.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is illustrated, by way of example, one embodiment of the invention as applied to a variable speed transmission comprising, in general, two units. One unit includes a combination of fluid flywheel, clutch and planetary gear-set of the general type above referred to. From this unit the drive is transmitted to a second unit comprising a two-speed and reverse gear box of conventional type where selection of the ratios is effected by sliding dog-clutches equipped with conventional self-synchronizing machinism. These two units and the controls which operate them are arranged so as to provide three phases of operation, any one of which can be manually selected by the driver, namely, (1) automatic, for normal driving, (2) emergency low, for maneuvering and very steep grades, and (3) reverse.

As illustrated in Fig. 1 of the drawings, the crankshaft or input shaft 9 of the engine is connected to a conventional fluid flywheel or coupling comprising casing members adapted to contain therebetween a body of oil or other hydraulic medium. The fluid coupling in the present instance comprises a suitable driving casing member 10 and a coacting driven casing member 12, these members being provided, respectively, with opposed impeller blades 11 and 13. Rotation of the driving member 10 from the crankshaft will cause the impeller blades 11 acting upon the oil within the casing to transmit torque through impeller blades 13 to the driven member 12 in accordance with known practice. The driven impeller member 12 is fastened to a shaft 14 and the driving member 10 has an annular flange 16 embracing the shaft 14 and engaging the same through the medium of an oil seal 15 preventing escape of oil from the flywheel. Attached to the rear end of the shaft 14 is the sun gear 17 of a planetary gear-set which also comprises planet pinions 18 and 19, the pinion 18 meshing with sun gear 17 and the pinion 19 meshing with a driven gear 20 of the gear-set. Each pair of planet pinions 18 and 19 is journalled on a stud shaft 21 carried by a supporting disk or planet pinion carrier 22. The latter is formed with an annular hub 22a surrounding the shaft 14, and between this hub and the shaft are interposed a series of wedging clutch elements 23 forming therewith a conventional one-way over-running clutch. The roller clutch elements 23 function to couple the shaft 14 and hub 22a together when the transmission is in direct drive and it is desirable that the fluid coupling should be cut out. However, when the drive is at reduced speed ratios and passes through the fluid coupling, the roller clutch elements 23 over-run and disengage the shaft 14 and hub 22a of the planet pinion carrier.

Surrounding the hub 22a of the planet pinion carrier 22 is a brake drum 24 having a hub flange 24a, and interposed between this flange and the hub 22a are a series of wedging clutch elements 26 forming therewith a one-way over-running clutch of conventional type similar to the wedging clutch device 23. Cooperating with the brake drum 24 is a brake band 25 which is operated by means of a hydraulic servomotor in the manner hereinafter described.

The hub 22a of the planet pinion carrier 22 has a suitable extension 27 axially of the shaft 14 which carries a friction clutch disk 28 of any standard type provided with friction means 28a engageable at selected times with surfaces 10a of the driving fluid coupling member 10 and a clutch pressure member when the transmission is in direct drive. The driving fluid coupling member 10 has an extension 29 mounted within a stationary ring or housing 30, and slidably mounted upon the extension 29 is a clutch pressure member 31. The extension 29 has a flange 32 lying within the pressure member 31 and forming therewith an oil chamber 33. The pressure member 31 has a flange 34 opposed to the clutch disk 28, which flange is formed with peripheral teeth 35 meshing with teeth on an annular ring 36 integral with the extension 29. By this construction the clutch pressure member 31 is drivingly connected to the fluid coupling member 10 and at the same time is shiftable relatively thereto in order to engage and disengage the clutch. Interposed between the pressure flange 34 and the flange 32 is a compression spring 37 which functions normally to maintain the clutch 28 in engagement with the flange 34 and the clutch surface 10a of the driving fluid coupling member 10.

Communicating with the oil chamber 33 is a drilled passage or conduit 38 which extends through the extension 29 and housing ring 30 and, as later described, communicates with a two-way valve operable to control the flow of oil under pressure through conduit 38 into the chamber 33. The pressure member 31 in conjunction with the extension 29 and associated parts thus provides a hydraulic servo motor operable to retract the pressure flange 34 against the action of spring 37 and disengage the clutch 28.

The driven gear 20 of the planetary gear-set is attached to a shaft 39 which carries at its rear end a gear 40 journalled on the front end of a splined driven shaft 41. The gear 40 is in constant mesh with a gear 42 on a shaft 43. Secured to this shaft is a gear 44 meshing with a gear 45 loose on the shaft 41. Reverse drive is obtained through the medium of a gear 46 on shaft 43 which through the medium of the usual gear on a countershaft 47 drives gear 48 on shaft 41 in the reverse direction.

The gear-set described in the previous paragraph constitutes a conventional two-speed and reverse transmission. Shaft 39 is locked to shaft 41 for direct drive, i. e. for the automatic phase. Shaft 39 drives shaft 41 through wheels 40, 42, 44 and 45 for low gear, i. e. for the emergency low phase. Shaft 39 drives shaft 41 through wheels 40, 42, 46, 47 and 48 for reverse gear, i. e. for the reverse phase.

The manually selected shift into automatic phase is accomplished by means of the usual shift collar 50 splined to a member 50a which in turn is keyed to the driven shaft 41, the collar 50 being shiftable into mesh with teeth 51 on gear 40 through a conventional synchronizing clutch 52. The manually selected shift into emergency low phase is accomplished by means of a shift collar 53 splined to a member 53a which is keyed to the driven shaft 41, the shift collar 53 being shiftable into mesh with teeth 55 on gear 45 through a conventional synchronizing clutch ring 54. The shift into reverse phase is accomplished by shifting the collar 53 into mesh with teeth 57 on reverse gear 48 through a conventional synchronizing clutch ring 56.

When the shift collar 50 is connected to the gear 40, the transmission is automatically operable throughout the entire driving range and is controlled by operation of the accelerator pedal. In order to facilitate maneuvering or operation on grades the emergency low ratio may be engaged by connecting the shift collar 53 with the gear 45. Shifting of the shift collars 50 and 53 is accomplished by means of a gear shift lever 58 which has the conventional reverse and low positions as well as the conventional high position in which the collar 50 is coupled with the gear 40. In the present transmission the conventional second gear position is omitted. Thus, the lever 58 may be positioned in the usual manner in any one of three positions to select the automatic phase, the emergency low phase or the reverse phase, after which the operation of the engine is controlled by the accelerator pedal. After operation in emergency low phase, the shift may be made into automatic phase in the regular manner by manually moving the shift lever 58.

Attached to the inner end of the gear shift lever 58 is a two-arm member 59 provided at its lower end with a lug or detent 60 adapted to be received within a notch 61 in one arm 62a of a bell crank lever 62, the lever 62 being pivotally mounted at 63 to a suitable fixed bracket. The arm 62a carries at its outer end a roller 64 engageable with the end of an arm 65a of a three-arm lever 65. This latter lever is pivotally mounted at 66 upon a suitable bracket and the upper arm 65b thereof is connected through the medium of a link 67 to the upper end of a conventional spring returned accelerator pedal 68, the latter being pivotally mounted at its lower end at 68a to a suitable floor bracket.

The bell crank lever 62 is provided with an arm 62b to the outer end of which is connected a tension spring 69. This spring is also connected to the outer end of a bell crank lever 70 pivotally mounted at 70a upon a suitable bracket. The lever 70 has a depending arm 70b provided with a notch 73 engageable by the end of a pawl arm 74 forming part of the lever 65. When the pawl arm 74 is engaged within the notch 73, as shown in Fig. 2, the lever 70 will be held in its up position against the tension of the spring 69 which in turn acts upon the accelerator pedal through the levers 62 and 65. The member 59, attached to the gear shift lever 58, carries at its upper end a roller 72 which has rolling engagement with a roller 71 on the lever 70.

From the foregoing it will be apparent that when the accelerator pedal 68 is released the arm 65a will raise the pawl arm 62a, thus disengaging the detent 60 from the notch 61. This will unlock the gear shift lever 58, permitting the latter to be moved to the appropriate position so as to engage the appropriate gear in the two speed gear box. When the gear shift lever is shifted from its neutral position shown in Fig. 2 to select a gear in the gear box, the roller 72 will be moved out of abutting engagement with the roller 71. Since the lever 70 is held in its up position, when the accelerator pedal is released, by means of the pawl 74 and notch 73 as shown in Fig. 2, disengagement of roller 72 from roller 71 by manipulation of the gear shift lever 58 will not in itself effect any movement of lever 70. However, after disengagement of rollers 71 and 72 the accelerator pedal 68 may be depressed, thereby moving pawl arm 74 out of notch 73 and releasing lever 70. When this occurs the tension spring 69 will act to swing the lever 70 in a downward direction, thereby exerting a downward pull on a link 75 connected to the lever 70.

The link 75 is connected at its outer end to a conventional two-way slide valve 76 mounted within a housing 77. Communicating with the chamber within the valve housing 77 is an oil pressure line 78 in the form of a suitable pipe or conduit leading to a conventional gear pump 79 and thence to a reservoir or tank 80 containing a supply of oil or other hydraulic medium. A second conduit 81 leads into the chamber within the valve housing 77 and is connected to a hydraulic servomotor comprising a cylinder 82 containing a reciprocable piston 83. This piston is connected by means of a piston rod 84 to a bracket 85 attached to one end of the brake band 25 which is wrapped around the brake drum 24 and controlled for adjustment in any conventional manner. Also communicating with the chamber within the valve housing 77 is a return oil conduit 86 which leads into the reservoir or tank 80.

In the position of the two-way valve 76, as shown in Fig. 2, it will be apparent that communication between the pressure line 78 and the valve chamber is blocked or interrupted by means of the valve 76 and, hence, the piston 83 will be relieved of pressure thus releasing the brake band 25. However, when the lever 70 is depressed by action of the spring 69 the valve 76 will be shifted into position to close off the conduit 86 and establish communication between the pressure conduit 78 and the conduit 81 leading to the brake band servomotor. Under such conditions the oil pressure within conduit 78, developed by the gear pump 79, will move the piston 83 to the right sufficiently to engage the brake band 25 with the brake drum 24 and thereby holding the latter stationary.

Communicating with the pressure conduit 78 is a by-pass return conduit 87 having a pressure relief valve 88 interposed therein and operable to maintain a predetermined maximum oil pressure within the line 78. Also communicating with the oil pressure line 78 is a conduit 89 leading into a chamber within a valve housing 90. Shiftable within this valve housing is a conventional two-way valve 91 which is shiftable to make or break communication between the conduit 89 and the chamber within the valve housing. A conduit 92 communicates with this chamber in valve housing 90 and is connected to the conduit 38, see Fig. 1, leading to the hydraulic clutch servomotor previously described. A return line or conduit 93 leads from the chamber within the valve housing 90 to the oil tank or reservoir 80.

It will be apparent that when the two-way valve 91 is in the position shown in Fig. 2 communication will be established between the oil pressure line 89 and the conduit 92 leading to the chamber 33 (Fig. 1) of the clutch servomotor, and under such circumstances the hydraulic pressure within chamber 33 will shift the clutch pressure member 31 to the right in Fig. 1, thus disengaging the clutch 28. When, however, the two-way valve 91 is shifted to the left in Fig. 2, the pressure line 89 will be closed off and communication will be established between conduits 92 and 93. When this occurs the pressure within chamber 33 of the clutch servomotor will be relieved and the spring 37 will then function to engage the clutch 28 with the driving member 10 of the fluid coupling.

The two-way valve 91 is connected through the medium of a link 94 to the upper arm 95a of a bell crank lever 95, this lever being pivotally mounted at 96 upon a suitable fixed bracket. The lower arm 95b of the bell crank lever 95 carries at its outer end a roller 97 connected to a collar 98 attached to a shiftable rod 99. This rod is freely movable within an aperture in a fixed support 100 and carries therebelow a collar 101. Interposed between the collar 101 and support 100 is a compression spring 102. Engageable with the collar 101 is a roller 103a journalled in the outer end of a bell crank lever 103. This lever is pivotally mounted at 104 upon a weight carrier 105 which is rigidly secured to a shaft 106 rotatable within a bearing 106a. Attached to the shaft 106 is a gear 107 which is driven in any suitable manner from the output shaft 41. The bell crank lever 103 carries inertia weights 108, the outward movement of which is partly controlled by means of light tension springs 109. These springs are so disposed with regard to the pivot 104 that their controlling force on the governor is greater when the governor is closed than when it is opened, thus making the governor open and close suddenly and also making it close at a lower speed than that at which it opens. The rotary carrier 105 and weighted levers 103 form a speed control governor so constructed and designed as to cause the weights 108 to fly outwardly to the dotted line position shown in Fig. 2 when the vehicle attains a predetermined speed. Movement of the weights 108 outwardly will cause the levers 103 to shift the rod 99 upwardly. This operation will result in rocking the lever 95 and closing the two-way valve 91 by shifting it from the position shown in Fig. 2 toward the left thus closing off the conduit 89, relieving the pressure within chamber 33 of the clutch servomotor and permitting spring 37 to engage clutch 28.

It will be noted that when the gear shift lever 58 is in neutral, as shown in Fig. 2, the rollers 71 and 72 will be in engagement and will hold the valve 76 in closed position at which time the piston 83 of the brake band servomotor will be in retracted position with the brake band 25 released. The engine is started with the gear shift lever in neutral and manipulation of the accelerator pedal 68 at this time will not affect the position of the valve 76. As soon as the engine starts, oil pressure will be built up by the pump 79 which is driven in any suitable manner from the engine. Since the valve 91 will be open at this time in the manner shown in Fig. 2, the oil pressure transmitted through line 92 and passage 38 to the clutch servomotor will disengage the clutch 28. In order to shift the lever 58 to the appropriate position the accelerator pedal 68 is released, thus disengaging lever 59 from the pawl arm 62a, as shown in Fig. 2, whereupon the gear shift lever will be unlocked and may be shifted. Upon moving the gear shift lever to the appropriate position the rollers 71 and 72 will be disengaged thereby causing the spring 69 to depress lever 70 and shift the valve 76 into open position, thus connecting pressure line 78 with conduit 81. When this occurs the piston 83 of the brake band servomotor will be shifted outwardly so as to engage the brake band 25 and bring the brake drum 24 to rest.

The controlling valve 91 for the high gear clutch is operated primarily by the centrifugal governor which is driven through gear 107 from the propeller shaft. The governor is spring loaded so as to be extremely sensitive and in the present instance is so adjusted that it opens, i. e. the weights 108 fly out, suddenly at 35 M. P. H. The governor will remain open at all speeds down to approximately 8 M. P. H. at which point it will close suddenly. Thus, when the governor is free to operate and is not restrained, as hereinafter described, it will control valve 91 in such manner as to maintain clutch 28 disengaged during acceleration up to a given speed, such as 35 M. P. H., and when such speed is attained it will shift valve 91 to closed position and permit spring 37 to engage the clutch.

Under operating conditions where a light throttle is used I find it desirable to provide means for opening the governor at a car speed less than 35 M. P. H. in order to effect engagement of the clutch 28 and thereby place the transmission in direct drive. This is accomplished in the present instance by vacuum means coupled to the governor. This vacuum means includes a casing 110 communicating through a conduit 111 with the engine manifold and closed at one side by a flexible diaphragm 112. Projecting from the rod 99 is a stem 113, Fig. 3, which extends into a hollow valve 114 and is piloted at its outer end for lost motion in a hole 115 in the valve. The valve is yieldably mounted on the stem for limited movement thereon against the action of a spring 116. A permanent bleed hole 117 into the chamber within casing 110 is provided in the diaphragm 112 around the stem 113. Movement of the diaphragm in response to suction induced in line 111 is resisted by means of a spring 118.

If light throttle is used in accelerating the car from rest, some vacuum is generated in the manifold, and since the manifold is in communication through conduit 111 with the chamber within casing 110 the partial vacuum in the manifold will act on the diaphragm 112, thereby shifting it upwardly and moving the rod 99 upwardly to open the governor. In the present instance the arrangement is such that at very light throttle the diaphragm 112 will be shifted by the partial vacuum in the manifold to open the governor, i. e. move the weights 108 outwardly, at a car speed of approximately 20 M. P. H. This movement of the diaphragm to open the governor will shift the needle valve 114 upwardly so as to block at 119 communication between conduit 111 and the chamber within casing 110. When this occurs the diaphragm 112 will be permitted to return to normal position under the influence of spring 118 since the partial vacuum created within the chamber will be relieved on account of the constant air bleed 117. A long as the governor remains open the conduit 111 will be closed off by the needle valve 114. However, when the road speed drops to approximately 8 M. P. H. the weights 108 will move inwardly, thereby depressing the rod 99 and moving the needle valve to its normal open position shown in Fig. 2.

Provision is made in the control mechanism of the transmission for holding the governor in closed position when the emergency low and reverse gears are engaged and also for preventing these gears from being engaged when the governor is in open position. Slidable in a hole in a fixed support 120 is a governor locking member 121 connected by a link 121a to lever arm 95a. Member 121 has a notch 122 engageable by a shiftable shuttle or detent 123. This detent is also engageable in a notch 124 in the emergency low and reverse shift rail 125. When the gear shift lever is moved into position either to engage the emergency low gear or the reverse gear, the rail 125 will be shifted longitudinally so as to cam the detent 123 out of the notch 124 and force it into the notch 122, thereby locking the member 121 and also the bell crank lever 95. When this occurs the rod 99 as well as the weights 108 will be held against outward movement. Upon moving the shift lever 58 to neutral position or into automatic position, the shift rail 125 will resume the position shown in Fig. 2, thus causing the detent 123 to drop into the notch 124 thereby freeing the governor for normal operation. It will thus be seen from the foregoing that the emergency low and reverse gears may not be engaged when the governor is in open position since under such conditions the locking member 121 will have been moved to the left in Fig. 2, thus placing notch 122 out of alignment with the detent 123 and thereby locking this detent within the notch 124.

In the event the accelerator pedal 68 is suddenly pressed to the floor, provision is made for automatically returning the governor to its closed position. This is accomplished by means of a rod 126 slidable within a hole in the support 120 and having one end slidably connected to the lever arm 95a. Movement of the rod 126 relative to the arm 95a is resisted by means of a spring 127. When the governor is opened the lever arm 95a will shift the rod 126 so that the outer end thereof will reach a position shown by the dotted line 128. In the event the accelerator pedal is forced to the floor the lever arm 65a will be moved to the dotted line position 129. If at that time the governor is open, the rod 126 is contacted by the lever arm 65a and moved to the right, either the spring 127 will be compressed or the governor will be returned to the closed position depending upon the pre-arranged strength of the spring 127 relative to the centrifugal forces acting on the governor weights at the time. If the governor is rotating at such a speed that the spring 127 can overcome the centrifugal forces, the governor will thereby be closed and valve 91 will be opened, thus disengaging clutch 28.

From the foregoing it will be seen that the controlling valve 76 for the brake band servo motor is actuated by mechanism associated with the gear shift lever 58 and accelerator pedal 63 so that the brake band 25 is contracted by the initial movement of the accelerator pedal after the gear shift lever has been moved out of neutral position. However, if the throttle is opened with the gear shift lever in neutral, the lever cannot be shifted nor the brake band contracted until the accelerator pedal is released.

When the clutch 28 is disengaged it will be noted that the planet pinion carrier 22 will be coupled to the brake drum 24 through the wedging clutch elements 26. At this time the wedging clutch elements 23 will be disengaged and the drive will pass through the fluid coupling, shaft 14 and the planetary gears to the output shaft 41. When, however, the clutch is engaged it will couple the planet pinion carrier to the input shaft through driving member 10, resulting in disengagement of wedging clutch 26 and in engagement of wedging clutch 23 and in the consequent coupling together of members 10 and 12 of the fluid coupling. A direct drive is thus obtained without any slippage due to relative motion between the members of the fluid coupling.

I claim:

1. In a variable speed transmission for an internal combustion engine, a planetary gear set, a fluid coupling having a driving element and a driven element, a friction clutch having a driven member connected to a portion of said gear set and adapted to be engaged with said driving element, a driving connection between said driven element and another portion of said gear set, and a one-way over-running clutch interposed between said driven member of the friction clutch and said driving connection for coupling the same together when said friction clutch is engaged.

2. In a variable speed transmission for an internal combustion engine, a planetary gear set, a fluid coupling having a driving element and a driven element, a friction clutch having a driven member connected to a portion of said gear set and adapted to be engaged with said driving element, a driving connection between said driven element and another portion of said gear set, a one-way over-running clutch interposed between said driven member of the friction clutch and said driving connection for coupling the same together when said friction clutch is engaged, hydraulically operated means for engaging and disengaging said friction clutch, and speed responsive means for controlling said hydraulically operated means.

3. In a variable speed transmission for an internal combustion engine, a planetary gear set, a fluid coupling having a driving element and a driven element, a friction clutch having a driven member connected to a portion of said gear set and adapted to be engaged with said driving element, a driving connection between said driven element and another portion of said gear set, a rotatable member, brake means therefor, an over-running clutch interposed between said rotatable member and said driven member of the friction clutch for coupling the same together when said friction clutch is disengaged, and a one-way over-running clutch interposed between said driven member of the friction clutch and said driving connection for coupling the same together when said friction clutch is engaged.

4. In a variable speed transmission for an internal combustion engine, a planetary gear set, a fluid coupling having a driving element and a driven element, a friction clutch having a driven member connected to a portion of said gear set and adapted to be engaged with said driving element, a driving connection between said driven element and another portion of said gear set, a rotatable member, brake means therefor, hydraulically controlled means for engaging said brake means under driving conditions, an over-running clutch interposed between said rotatable member and said driven member of the friction clutch for coupling the same together when said friction clutch is disengaged, and a one-way over-running clutch interposed between said driven member of the friction clutch and said driving connection for coupling the same together when said friction clutch is engaged.

5. In a variable speed transmission for an internal combustion engine, a fluid coupling including driving and driven members, a planetary gear set including planet pinions and a sun gear, clutch means interposed between the driving member of the fluid coupling and the planet pinions of said set, means for drivingly connecting said driven member with the sun gear of said set, mechanism for engaging and disengaging said clutch means, and an over-running clutch for positively connecting said driving member of the fluid coupling and said second named means when said clutch means is engaged.

6. In a variable speed transmission for an internal combustion engine, a fluid coupling including driving and driven members, a planetary gear set including planet pinions and a sun gear, clutch means interposed between the driving member of the fluid coupling and the planet pinions of said set, means for drivingly connecting said driven member with the sun gear of said set, mechanism for engaging and disengaging said clutch means, and means including an over-running clutch for positively connecting said driving and driven members of the fluid coupling when said clutch means is engaged.

7. In a variable speed transmission for an internal combustion engine, a fluid coupling including driving and driven members, a planetary gear set including planet pinions and a sun gear, clutch means interposed between the driving member of the fluid coupling and the planet pinions of said set, means for drivingly connecting said driven member with the sun gear of said set, mechanism including governor means driven by the engine for engaging and disengaging said clutch means, and means including an overrunning clutch for positively connecting said driving and driven members of the fluid coupling when said clutch means is engaged.

8. In a variable speed transmission for an internal combustion engine, a fluid coupling including driving and driven members, a planetary gear set including planet gear means and sun gear means, a clutch interposed between the driving member and one of said gear means, a driving connection between said driven member and the other of said gear means, mechanism including governor means driven by the engine for automatically engaging and disengaging said clutch, and over-running clutch means for positively connecting said driving connection and said driving member when said clutch is engaged.

9. In a variable speed transmission for an internal combustion engine, a fluid coupling having driving and driven members, a planetary gear set including a sun gear and a planet pinion carrier, a friction clutch interposed between the driving member and said carrier, a driving connection between said driven member and said sun gear, a brake drum having a brake band adapted to be engaged therewith or disengaged therefrom, means for engaging and disengaging said friction clutch, means for engaging and disengaging said brake band, over-running clutch means interposed between said carrier and driving connection for connecting the same together when said friction clutch is engaged, and over-running clutch means interposed between said carrier and brake drum for connecting the same together when said friction clutch is disengaged.

10. In a variable speed transmission for an internal combustion engine, a fluid coupling having driving and driven members, a planetary gear set including a sun gear and a planet pinion carrier, a friction clutch interposed between the driving member and said carrier, a driving connection between said driven member and said sun gear, a brake drum having a brake band adapted to be engaged therewith or disengaged therefrom, governor operated means for engaging and disengaging said friction clutch, means for engaging and disengaging said brake band, over-running clutch means interposed between said carrier and driving connection for connecting the same together when said friction clutch is engaged, and over-running clutch means interposed between said carrier and brake drum for connecting the same together when said friction clutch is disengaged.

11. In a variable speed transmission for an internal combustion engine, a fluid coupling having driving and driven members, a planetary gear set including a sun gear and a planet pinion carrier, a friction clutch interposed between the driving member and said carrier, a driving connection between said driven member and said sun gear, a brake member adapted to be held in stationary position, governor operated means for engaging and disengaging said friction clutch, over-running clutch means interposed between said carrier and driving connection for coupling the same together when said friction clutch is engaged, and over-running clutch means interposed between said carrier and brake member for connecting the same together when said friction clutch is disengaged.

12. In a variable speed transmission for an internal combustion engine, a fluid coupling having driving and driven members, a planetary gear set including a sun gear and a planet pinion carrier, a friction clutch interposed between the driving member and said carrier, a driving connection between said driven member and said sun gear, a brake member adapted to be held in stationary position, governor operated means for engaging and disengaging said friction clutch, over-running clutch means interposed between said carrier and driving connection for coupling the same together when said friction clutch is engaged, over-running clutch means interposed between said carrier and brake member for connecting the same together when said friction clutch is disengaged, an output shaft, and means for connecting said output shaft to said planetary gear set.

13. In a variable speed transmission for an internal combustion engine, an input shaft, a fluid coupling having a driven member and a driving member, said driving member being connected to the input shaft, a planetary gear set having a gear means, an output shaft, means for connecting said planetary gear set to the output shaft, a clutch interposed between said driving member and said gear means, an over-running clutch interposed between said driven member and said gear means and effective to couple the same together when said first named clutch is engaged, hydraulically operated means for engaging and disengaging said first named clutch, and governor operated means driven by the engine for controlling said hydraulically operated means.

14. In a variable speed transmission for an internal combustion engine, an input shaft, a fluid coupling having a driven member and a driving member, said driving member being connected to the input shaft, a planetary gear set having a first and second gear means, an output shaft, means for connecting said first gear means to the output shaft, a clutch interposed between said driving member and said second gear means, an over-running clutch interposed between said driven member and said second gear means and effective to couple the same together when said first named clutch is engaged, a brake drum adapted to be held stationary during driving conditions, an over-running clutch interposed between said drum and said second gear means and effective to couple the same together when said first named clutch is disengaged, hydraulically operated means for engaging and disengaging said first named clutch, and governor operated means for controlling said hydraulically operated means.

15. In a variable speed transmission, a fluid coupling including driving and driven members, a planetary gear set, clutch means interposed between the driving member of the fluid coupling and a portion of said gear set, a shaft connecting said driven member with another portion of said set, means for engaging and disengaging said clutch means, and a one-way over-running clutch for coupling said driving member of the fluid coupling and said shaft together when said clutch means is engaged.

16. In a variable speed transmission, a fluid coupling including driving and driven members, a planetary gear set, clutch means interposed between the driving member of the fluid coupling and a portion of said gear set, a shaft connecting said driven member with another portion of said set, means including a centrifugal governor for engaging and disengaging said clutch means, and a one-way over-running clutch for coupling said driving member of the fluid coupling and said shaft together when said clutch means is engaged.

17. In a variable speed transmission, a fluid coupling including driving and driven members, a planetary gear set, clutch means interposed between the driving member of the fluid coupling and a portion of said gear set, a shaft connecting said driven member with another portion of said set, means for engaging and disengaging said clutch means, an output shaft, means for connecting said output shaft to said planetary gear set, and an over-running clutch for coupling said driving member of the fluid coupling and said first named shaft together when said clutch means is engaged.

18. In a variable speed transmission, a fluid coupling including driving and driven members, a planetary gear set, clutch means interposed between the driving member of the fluid coupling and a portion of said gear set, a shaft connecting said driven member with another portion of said set, means for engaging and disengaging said clutch means, an output shaft, means for selectively connecting said output shaft to a portion of said planetary gear set, and an over-running clutch for coupling said driving member of the fluid coupling and said first named shaft together when said clutch means is engaged.

19. In a variable speed transmission for an internal combustion engine, a planetary gear set including a sun gear and a planet pinion carrier, a fluid coupling having a driving element and a driven element, a friction clutch having a driven member connected to said planet pinion carrier and adapted to be engaged with or disengaged from said driving element, a driving connection between said driven element and said sun gear, a rotatable member, brake means therefor, hydraulically controlled means for engaging said brake means under driving conditions, an over-running clutch interposed between said rotatable member and said driven member of the friction clutch for coupling the same together when said friction clutch is disengaged, an over-running clutch interposed between said driven member of the friction clutch and said driving connection for coupling the same together when said friction clutch is engaged, hydraulically operated means for engaging and disengaging said friction clutch, and a centrifugal governor driven from the engine for controlling said hydraulically operated means.

20. In a variable speed transmission for an internal combustion engine, a planetary gear set including a sun gear and a planet pinion carrier, a fluid coupling having a driving element and a driven element, a friction clutch having a driven member connected to said planet pinion carrier and adapted to be engaged with or disengaged from said driving element, a driving connection between said driven element and said sun gear, a rotatable member, brake means therefor, hydraulically controlled means for engaging said brake means, an over-running clutch interposed between said rotatable member and said driven member of the friction clutch for coupling the same together when said friction clutch is disengaged, an over-running clutch interposed between said driven member of the friction clutch and said driving connection for coupling the same together when said friction clutch is engaged, hydraulically operated means for engaging and disengaging said friction clutch, a centrifugal governor driven from the engine for controlling said hydraulically operated means, and vacuum controlled means for operating said governor when the same is driven at a predetermined low speed.

REID A. RAILTON.

REFERENCES CITED

The following references are of record in the file of this patent:

UNITED STATES PATENTS

| Number | Name | Date |
|---|---|---|
| 2,303,975 | Banker | Dec. 1, 1942 |
| 2,324,733 | Smirl | July 20, 1943 |
| 2,332,593 | Nutt et al. | Oct. 26, 1943 |
| 2,333,680 | Schneider | Nov. 9, 1943 |
| 2,371,574 | Swennes | Mar. 13, 1945 |
| 2,418,378 | Voytech | Apr. 1, 1947 |